May 27, 1924.  1,495,718
F. E. SHERIDAN
BRAKE OF MOTOR ROAD VEHICLES
Filed Oct. 13, 1923
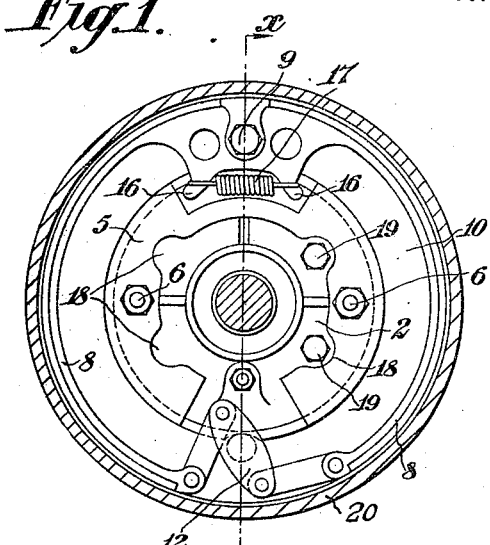
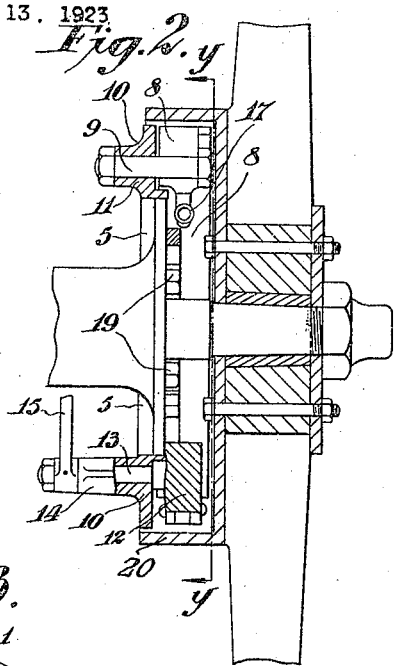
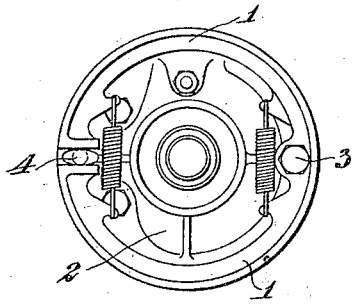
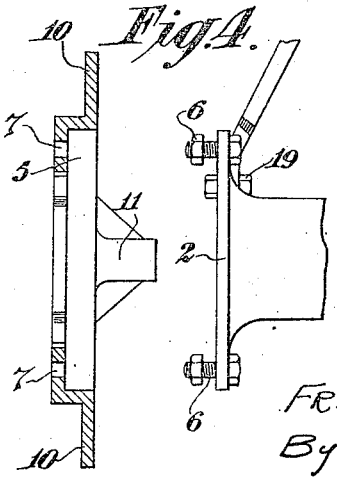
INVENTOR
FRANCIS E. SHERIDAN
By
Atty Patented May 27, 1924.

1,495,718

UNITED STATES PATENT OFFICE.

FRANCIS ERNEST SHERIDAN, OF DOVER, ENGLAND, ASSIGNOR OF ONE-HALF TO HARRY UPINGTON HOOPER, OF DOVER, ENGLAND.

BRAKE OF MOTOR ROAD VEHICLES.

Application filed October 13, 1923. Serial No. 668,367.

*To all whom it may concern:*

Be it known that I, FRANCIS ERNEST SHERIDAN, a subject of the King of Great Britain and Ireland, and a resident of Dover, Kent, England, have invented certain new and useful Improvements in or Relating to the Brakes of Motor Road Vehicles, of which the following is a specification.

This invention of improvements in or relating to the brakes of motor road vehicles, has for its object to provide for such vehicles wherein the existing brakes are inefficient in action, means whereby a brake assembly of larger dimensions may be adapted to fit in place of said existing brakes. The invention applies to brakes of the internal expanding type and is more particularly directed for use with "Ford" motor vehicles.

The invention, broadly speaking, comprises a flanged circular plate adapted to be secured to the usual flanged extremity of the rear axle casing after the various parts comprising the existing brake have been removed, and constructed and adapted to hold a brake assembly of larger dimensions. The said plate is dished, that is to say, formed with an annular external flange with an annular recessed part in the centre.

When the various parts of the existing brake have been removed, the device is placed on the end of the axle casing in such a manner the flanged end of said axle casing engages into the recessed part of the plate, being bolted thereto. The flange of the plate carries the toggle lever and pivot of the brake shoes for the new brake, and the existing brake drum carried by the road wheel is replaced by a larger one to coact with the brake shoes provided according to our invention.

A preferred construction of apparatus according to my invention and particularly intended for application to "Ford" motor vehicles is illustrated in the accompanying drawings, wherein:—

Figure 1 is a face view of the apparatus applied, being a section through line *y—y* in Figure 2.

Figure 2 is a vertical section through line *x—x* in Figure 1.

Figure 3 is a face view of an existing brake to which the invention applies, and Figure 4 is a plan view of the end of an axle casing with the existing brake parts as shown in Figure 3 removed, showing the plate in section and method of fitting.

Referring firstly to Figure 3, the existing brake shown therein, and to which my invention applies, comprises a pair of shoes 1 pivotally secured to the flanged end of the axle casing 2 by means of a common pivot pin 3, and an actuating cam or equivalent 4 for expanding the shoes, the spindle of which passes through a hole in the casing and has secured thereto an actuating lever.

To apply my invention to the brake as shown in Figure 3, the various parts constituting the existing brake are removed from the end of the axle casing 2 as shown in Figure 4.

On to the end of the axle casing 2 is secured a recessed plate 5 having a recess of such a size as to receive the said axle casing into it, and the said plate 5 is secured to the axle casing by means of bolts 6, which pass through the existing holes in the axle casing previously occupied by the pivot pin 3 and shoe actuating member 4 respectively. Corresponding holes 7 are formed in the plate 5.

The plate 5 is adapted to hold the component parts of a brake assembly of larger dimensions than that shown in Figure 3, and such parts as shown in Figures 1 and 2 consist of brake shoes 8 pivotally secured by a common pivot pin 9 to the flanged part 10 of the plate 5, the said pivot pin being supported by an integral boss 11 on the outer side of the plate.

The outer ends of the shoes 8 are connected by a toggle lever 12 which is fixedly carried on the end of a spindle 13 which is rotatably mounted in a boss 14 integral with the plate. Said spindle 13 extends beyond the boss 14 and has secured to it an actuating lever 15.

The boss 14, or both of the bosses 11 and 14 respectively, may be webbed to give additional strength.

The brake shoes 8 in the vicinity of their pivot pin 9, have hooked shaped projections 16 which hold the ends of a coil tension spring 17, serving to keep the said shoes normally in a contracted state.

The centre of the recessed part of the plate 5 may be cut away in circular or other fashion as shown to decrease the weight and clear any obstructing parts of the axle casing. In the plate as illustrated, a circular aperture is cut away, and gaps 18 are cut away in the periphery of such aperture to clear the bolts 19 which serve to clamp the torque rod to the axle casing. Similar gaps are formed on the opposite side of the aperture so that the attachment may be applied to either the near side wheel or off side wheel of the vehicle. The recessed part of the plate is also cut away as shown to allow movement of the toggle lever 12 and to accommodate the spring 17.

In applying the attachment, the existing brake drum carried by the road wheel is replaced by one, 20, of a larger diameter to co-act with the brake shoes 8.

If desired, there may be employed lugs or angle pieces secured to the plate 5 and adapted to pass around the periphery of the new brake drum 20, fitted, each having a bent-over part on the outer side of said brake drum. Said lugs do not touch the brake drum, but in the case of the axle breaking, the road wheel cannot become detached, as the brake drum will contact with the bent-over part of said lugs.

I claim:—

1. Means for adapting to motor vehicles constructed with rear wheel brakes of the internal expanding type, similar brakes of larger dimensions, comprising in combination with the axle casing, a flanged and recessed circular plate adapted to be secured to the flanged extremity of the axle casing when the parts of the existing brake have been removed, in such manner that the said end of the axle casing takes into the recess, the flanged part of said plate, being adapted to carry the new brake parts, substantially as herein described.

2. Apparatus of the class described comprising a flanged and recessed circular plate, the recessed part of the plate being formed with apertures adapted to register with the bearing holes in the axle casing, of the shoe pivot and shoe expander spindle of the existing brake, and adapted to be clamped to the axle casing by bolts in such registering holes, as herein described.

3. Apparatus for the adaptation of wheel brakes comprising a flanged and recessed circular plate, wherein the flanged part of the plate is formed with diametrically opposite bosses constituting bearings for the pivot pin and actuating lever spindle respectively of the brake shoes, and wherein the recessed part of the plate is centrally cut away substantially as and for the purposes described.

In testimony whereof I have affixed my signature hereto this 2nd day of October, 1923.

FRANCIS ERNEST SHERIDAN.